US009955680B2

(12) United States Patent
Powell

(10) Patent No.: US 9,955,680 B2
(45) Date of Patent: May 1, 2018

(54) ARTICULATING ICE SCOOP FOR ICE FISHING

(71) Applicant: Gary A. Powell, Florissant, CO (US)

(72) Inventor: Gary A. Powell, Florissant, CO (US)

( * ) Notice: Subject to any disclaimer, the term of this patent is extended or adjusted under 35 U.S.C. 154(b) by 0 days. days.

(21) Appl. No.: 15/622,366

(22) Filed: Jun. 14, 2017

(65) Prior Publication Data

US 2017/0354134 A1    Dec. 14, 2017

Related U.S. Application Data

(60) Provisional application No. 62/349,861, filed on Jun. 14, 2016.

(51) Int. Cl.
*A01K 97/01* (2006.01)
(52) U.S. Cl.
CPC .................................. *A01K 97/01* (2013.01)
(58) Field of Classification Search
CPC .... A01K 1/0114; A01K 23/005; A01K 97/01; E01H 1/1206; B65D 2547/06; B65D 51/18; B07B 1/02
See application file for complete search history.

(56) References Cited

U.S. PATENT DOCUMENTS

| | | | | |
|---|---|---|---|---|
| 3,747,253 A * | 7/1973 | Gangi | ..................... | A01K 97/01 294/2 |
| 8,152,657 B2 * | 4/2012 | Green | ..................... | A63B 47/02 294/19.2 |
| 2008/0042456 A1 * | 2/2008 | Patel | ..................... | E01H 1/1206 294/1.3 |
| 2009/0278366 A1 * | 11/2009 | Lipscomb | ............ | A01K 1/0114 294/1.4 |
| 2015/0042112 A1 * | 2/2015 | Briski | .................. | E01H 1/1206 294/1.4 |
| 2016/0227727 A1 * | 8/2016 | Taylor | .................. | A01K 1/0114 |

* cited by examiner

*Primary Examiner* — Stephen Vu
(74) *Attorney, Agent, or Firm* — Eric W. Cernyar

(57) ABSTRACT

An ice fishing tool takes the form of an articulating scoop or ladle for scooping out fish, ice, or debris configured as an ice fishing tool. The tool comprises a handle, a perforated scoop, and a shaft connecting the handle to the scoop. The tool also comprises an articulating actuating assembly made up of a spring and one or more pivotally-connected links that couple a handle trigger to the scoop. Actions of squeezing the handle trigger toward the handle and releasing the handle trigger cause the scoop to move between a position approximately parallel to the shaft and a position approximately perpendicular to the shaft.

19 Claims, 5 Drawing Sheets

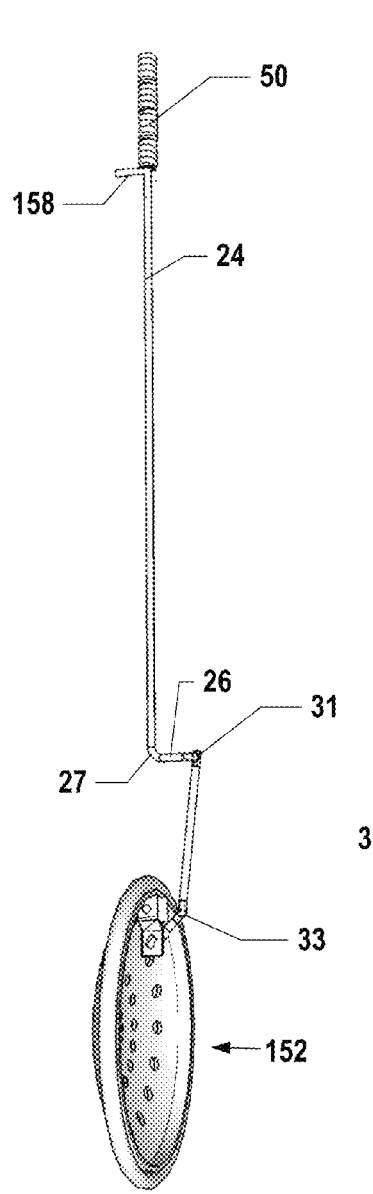
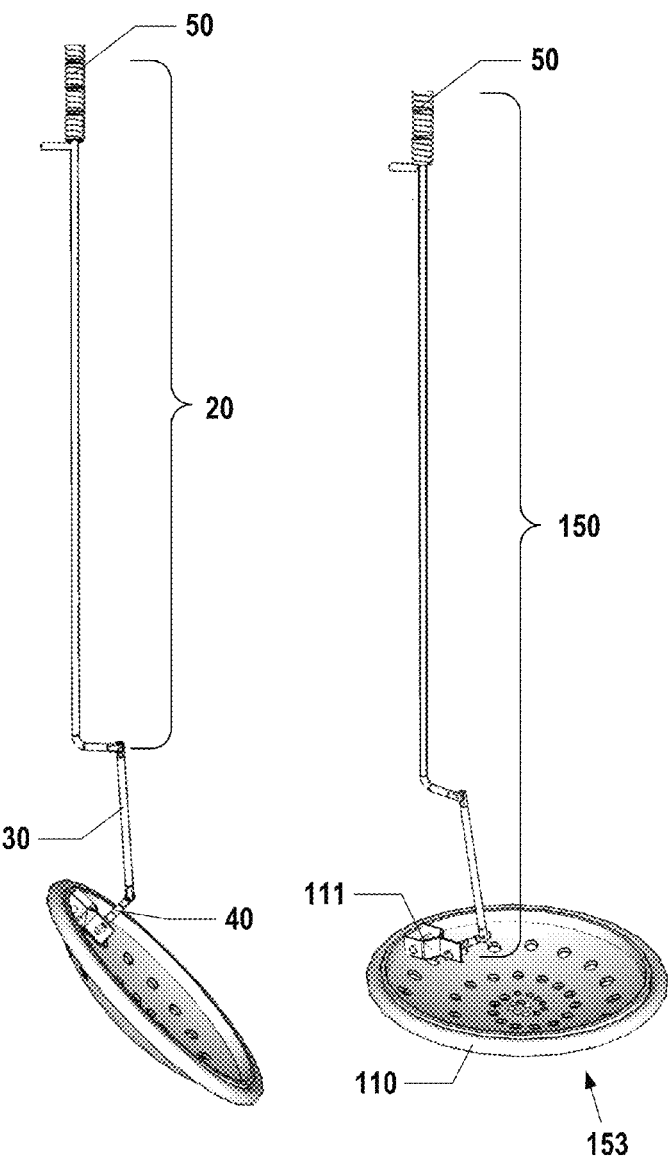
Fig. 4  Fig. 5  Fig. 6

US 9,955,680 B2

ARTICULATING ICE SCOOP FOR ICE FISHING

RELATED APPLICATIONS

This application claims the benefit of U.S. Provisional Patent Application No. 62/349,861, filed on Jun. 14, 2016, which is incorporated herein by reference.

FIELD OF THE INVENTION

The present disclosure generally relates to an articulating ice scoop.

BACKGROUND

Currently there are a number of solutions for maintaining a hole in the ice for ice fishing and pulling the fish out of the hole once one has been caught. One of these solutions attempts to pull the fish directly out of the water using the fishing line, but this solution fails to meet the needs of the market because the fisherperson may get wet and cold or the line may break. Another solution attempts to scoop ice out of the ice hole with other ice scoops, but this solution is similarly unable to meet the needs of the market because this requires bending and lifting which is hard on the back and not good for the elderly or someone with a disability.

SUMMARY

It would be advantageous to have an apparatus that is an articulating ice ladle for ice fishing. Furthermore, it would also be advantageous to have an apparatus that allows for the removal of floating ice and freshly caught fish without bending over and getting the user's hands wet. Therefore, there currently exists a need in the market for an apparatus that is an articulating ice scoop and is available in different sizes to suit all fisherperson's needs.

Accordingly, an articulating ice scoop is provided to extract ice, debris and/or fish through a hole drilled within the ice when ice fishing. To withstand these harsh environments, the device major components are preferably constructed with a temperature resistant polypropylene material and stainless steel. Advantageously, the invention provides an easy way to scoop ice and fish out of an ice fishing hole without bending over or getting wet hands. Moreover, it allows the fisherperson to land fish without getting their hands wet, and to remove ice shavings without having to kneel down.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWINGS

The present disclosure may be better understood with reference to the following figures. Corresponding reference numerals designate corresponding parts throughout the figures, and components in the figures are not necessarily to scale.

It will be appreciated that the drawings are provided for illustrative purposes and that the invention is not limited to the illustrated embodiment. For clarity and in order to emphasize certain features, not all of the drawings depict all of the features that might be included with the depicted embodiment. The invention also encompasses embodiments that combine features illustrated in multiple different drawings; embodiments that omit, modify, or replace some of the features depicted; and embodiments that include features not illustrated in the drawings. Therefore, it should be understood that there is no restrictive one-to-one correspondence between any given embodiment of the invention and any of the drawings.

FIG. 4 is a perspective view of one embodiment of an articulating actuator assembly, with the scoop in a 0-degree configuration.

FIG. 5 is a perspective view of the articulating actuator assembly of FIG. 4, with the scoop in a 45-degree configuration.

FIG. 6 is a perspective view of the articulating actuator assembly of FIG. 4, with the scoop in a 90-degree configuration.

DETAILED DESCRIPTION

Figure 1:
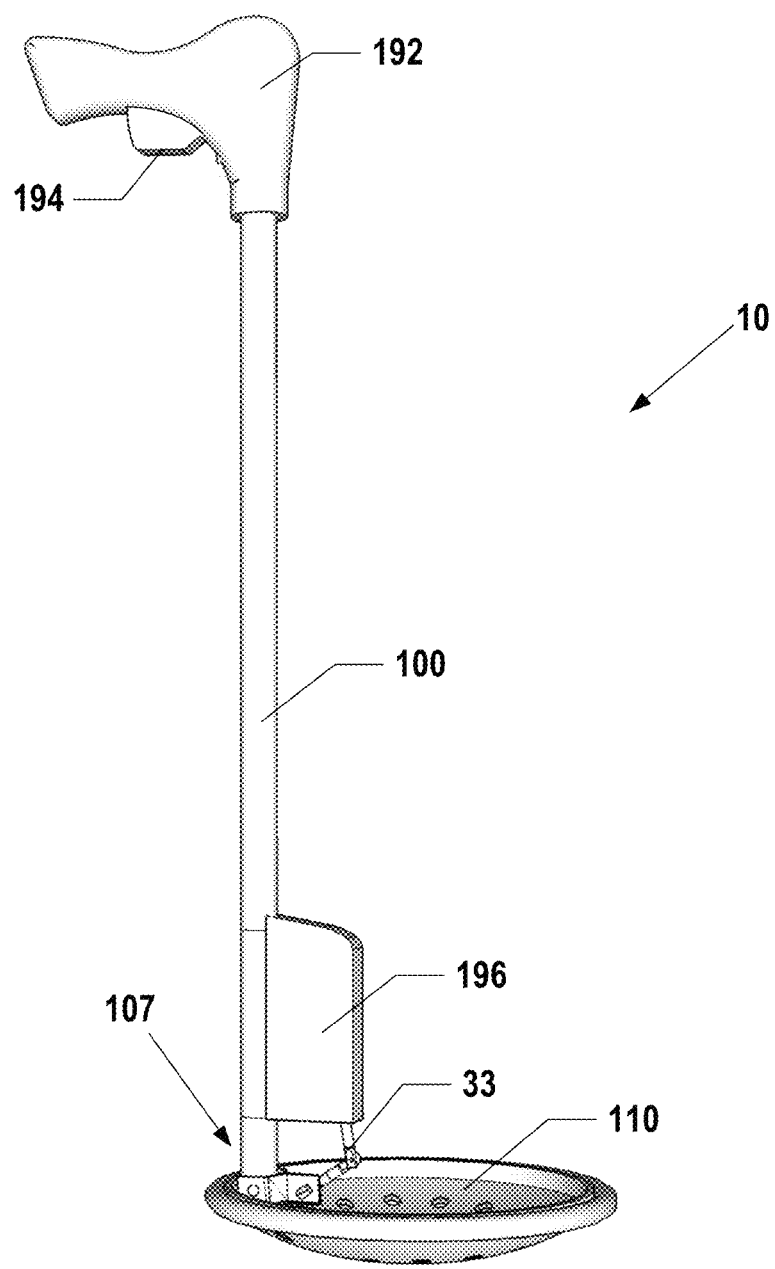
FIG. 1 is a perspective view on one embodiment of an articulating scoop apparatus, showing the scoop in a 90-degree configuration.
Figure 2:
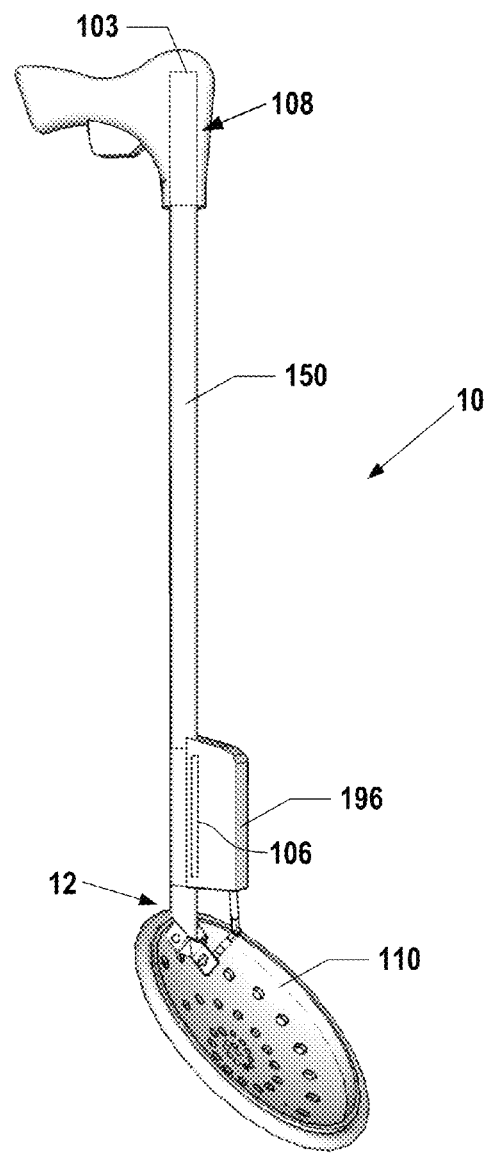
FIG. 2 is another perspective view of the articulating scoop apparatus of FIG. 1, showing the scoop in a 45-degree configuration.
Figure 3:
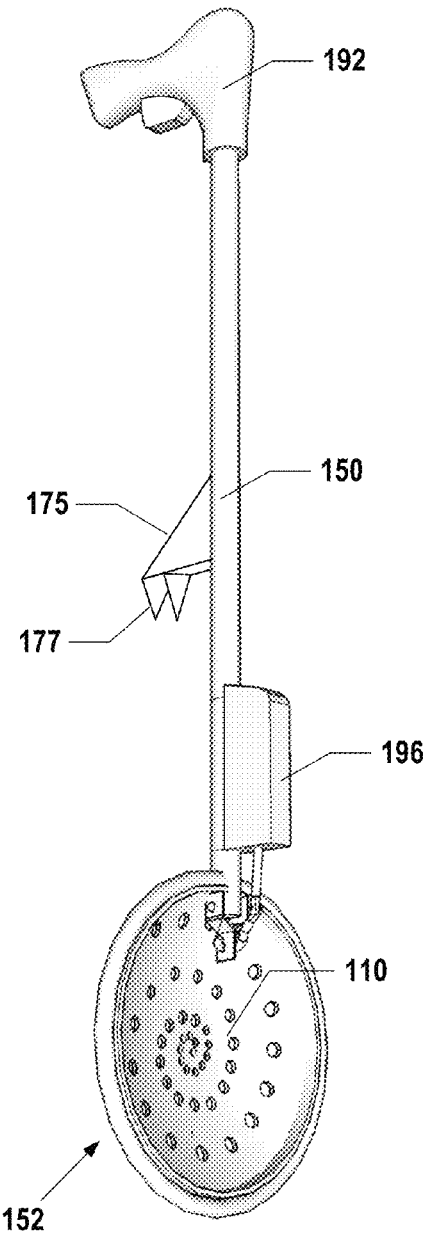
FIG. 3 is another perspective view of the articulating scoop apparatus of FIG. 1, showing the scoop in a 90-degree configuration.
Figures 7, 8:
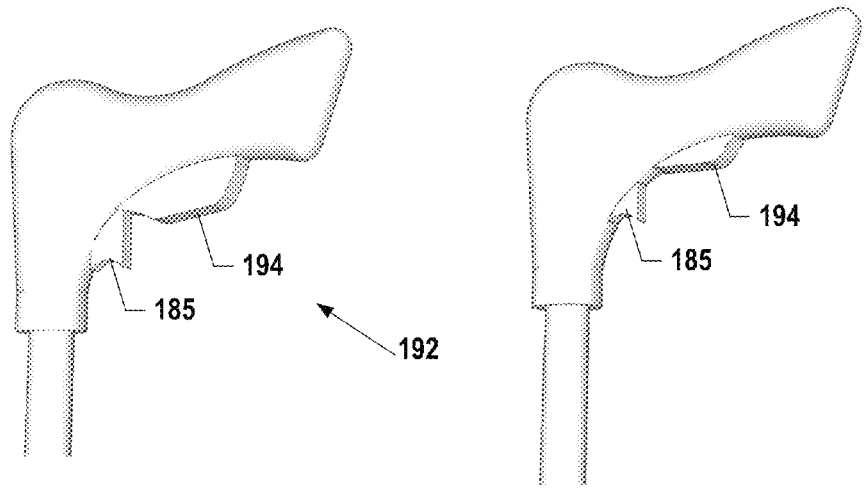
FIG. 7 is a perspective view of a handle with the trigger disengaged.
FIG. 8 is a perspective view of a handle with the trigger squeezed and engaged.
Figures 9, 10:
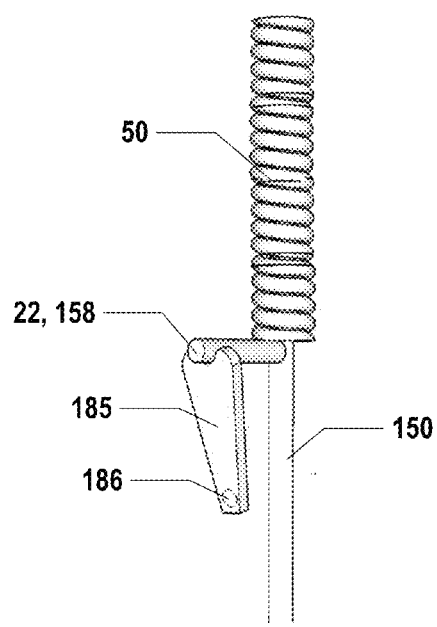
FIG. 9 is a perspective cutaway view of one embodiment of a lock mechanism.
FIG. 10 is a perspective cutaway view of the lock mechanism of FIG. 9, showing it within the context of a shaft window.
Figure 11:
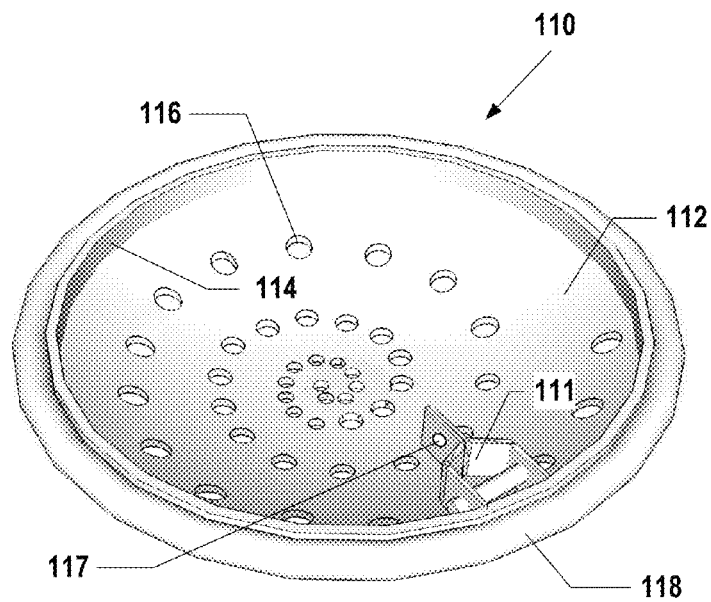
FIG. 11 is a perspective view of one embodiment of a scoop.

Any reference to "invention" within this document is a reference to an embodiment of a family of inventions, with no single embodiment including features that are necessarily included in all embodiments, unless otherwise stated. Furthermore, although there may be references to "advantages" provided by some embodiments, other embodiments may not include those same advantages, or may include different advantages. Any advantages described herein are not to be construed as limiting to any of the claims.

Specific quantities, dimensions, spatial characteristics, compositional characteristics and performance characteristics may be used explicitly or implicitly herein, but such specific quantities are presented as examples only and are approximate values unless otherwise indicated. Discussions and depictions pertaining to these, if present, are presented as examples only and do not limit the applicability of other characteristics, unless otherwise indicated. When a range is given, it is to be understood that the invention can be characterized using any subrange within that range.

In describing preferred and alternate embodiments of the technology described herein, as illustrated in FIGS. 1-12, specific terminology is employed for the sake of clarity. The technology described herein, however, is not intended to be limited to the specific terminology so selected, and it is to be understood that each specific element includes all technical equivalents that operate in a similar manner to accomplish similar functions.

The invention is directed to be an articulating ice scoop. The articulating ice scoop maintains holes cut in the ice for ice fishing with a dual purpose of retaining and scooping out the fish once a fisherperson or other operator has secured them on a fishing line. To scoop ice and fish from the water, the device is placed into the ice hole where a squeezing of the handle flips the scoop portion up. The scoop on the end of the device goes from being fully vertical to a substantially 90-degree angle when it is lifted, trapping and retaining ice, debris, and potentially caught fish.

Referring to the figures, FIGS. 1-12 illustrate one embodiment of an articulating scoop apparatus 10 configured for use in ice fishing. The articulating scoop apparatus 10 is designed to clean a fishing hole of ice, debris, and potentially aid in the retrieval of caught fish. The articulating scoop apparatus 10 comprises a handle 192, an articulating scoop 110, a shaft 100 connecting the handle 192 to the articulating scoop 110, and an articulating actuating assembly 150.

In one implementation, the shaft 100 is cylindrical. In another implementation, the shaft 100 is rectilinear. In various implementations, the shaft 100 may be referred to as a pole, tube, or beam, and may be made of metal, plastic, fiberglass, or a synthetic.

The articulating actuating assembly 150, best illustrated by FIGS. 4-6, comprises a first rod or link 20, a second rod or link 30, a scoop link 40 (which in one implementation is a hook, and in another a rod), and a spring 50. The first rod 20 is mounted inside the shaft 100 for linear travel along the length of the shaft 100 between the scoop-engaging position 153 and the scoop-releasing position 152.

The first rod 20 comprises first and second segments 24, 26, wherein the first segment 24 is parallel to the shaft 100 (i.e., vertical) and the second segment 26 is perpendicular to the shaft 100 (i.e., horizontal). The first rod 20 is bent at the vertex 27 of the first and second segments 24, 26.

The second rod 30 is hingedly connected about a first pivot point 31 to a terminal end of the second segment 26 of the first rod 20. Although it pivots about the pivot point 31 a few degrees (e.g., less than 20°), the second rod 30 extends generally parallel to the length of the shaft 100. The second rod 30 has a second pivot point 33 opposite the first pivot point 31.

A scoop link 40 is hingedly connected to the second rod 30 at the second pivot point 33. The scoop link 40, which in one implementation is a hook, links the second rod 30 to a pivot point 117 (FIG. 11) of a coupling 111 of the scoop 110. The coupling 111 is both rigidly connected to the scoop 110 and hingedly connected to the bottom end 107 (scoop end) of the shaft 100. In one implementation, the coupling 111 is a yoke that mounts over the bottom end 107 of the shaft 100. The articulating actuating assembly 150 is constrained to articulate, as the first rod 20 travels between the scoop-engaging position 153 and the scoop-releasing position 152, in a manner that forces the yoke 111 and the scoop 110 attached to it to pivot about 90 degrees (i.e., between 80 and 100 degrees).

In one embodiment, the articulating actuating assembly 10 further comprises an extension or stub 158 that is part of or attached to the first rod 20. The stub 158 projects, in a direction perpendicular to the shaft 100, out of a top side window 104 (FIG. 10) of the shaft 100. The top side window 104 has a longitudinal dimension, parallel to the shaft 100, that is approximately equal to a distance the first rod 20 travels between the scoop-engaging position 153 and the scoop-releasing position 152.

The spring 50 is contained within the shaft 100 and mounted on the first rod 20. The spring 50 is compressed between a first stop 103 connected to the shaft 100 and a second stop 22 connected to or part of the first rod 20.

In one implementation, the spring 50 is seated near the handle end of the articulating scoop apparatus 10. The first stop 103 is the top end or cap of the shaft 100. The second stop 22 is the stub 158 mentioned above.

In another implementation (not shown), the spring 50 is seated toward the bottom end 107 of the articulating scoop apparatus 10. The first stop 103 is a spring seat 105 (such as a ring) mounted to and protruding within interior sidewalls of the shaft 100 that contains the spring 50 but allows passage by the first rod 20 through the spring seat 105. The second stop 22 is the second segment 26 of the first rod 20. The second segment 26 protrudes out the shaft 100 through a bottom side window 106 of the shaft 100 that has a dimension, parallel to the shaft 100, that is approximately equal to a distance that the first rod 20 travels between the scoop-engaging position 153 and the scoop-releasing position 152. A cover 196 conceals the bottom side window 106.

With either implementation, the spring 50 urges the first rod 20 of the articulating actuating assembly 150 downward, into a scoop-releasing position 152.

It will be understood that the described articulating actuating assembly 150 is exemplary, but that it encompasses any combination of a spring or spring-equivalent device and a plurality of pivoting links that perform the same function.

The scoop 110 is sized to fit within an ice fishing hole. Ice fishing holes are often dug with ice augers. Standard auger diameter sizes are 6, 8 and 10 inches. In various preferred implementations, the scoop 110 is preferably about 5½ to 6 inches, 7½ to 8 inches, or 9½ to 10 inches in diameter, in order to fit within an ice hole drilled using a standard auger diameter size. Alternatively, the scoop 110 has any diameter of between about 5½ and 16 inches. In one embodiment, the scoop 110 (FIG. 11) has a shallow bowl-shaped or saucer-shaped profile comprising a curved base 112 and a cylindrical rim 114 rising up from the circumference of the curved base 112. Also, in one embodiment, the scoop 110 is perforated and may be characterized as a colander or a bowl-shaped sieve. In particular, a plurality of apertures 116 are distributed along a bottom of the scoop 110 to allow water to pass through while fish, ice, or debris are removed from a fishing hole. In another embodiment, the scoop 110 includes a flotation ring 118 surrounding the rim 114, which provides approximately neutral buoyancy, but nevertheless sufficient to prevent sinking of the articulating scoop apparatus 10. In one implementation, the flotation ring 118 is a hollow toroid. In a different implementation, the flotation ring 118 is filled with foam.

The handle 192 (FIGS. 7-8) is fixedly (non-pivotally) mounted to a top portion 108 of the shaft 100. The handle 192 is ergonomically designed for maximum comfort and an easy to operate squeeze activated trigger 194 in the handle 192 to flip the scoop 110 into position. The scoop 110 is hingedly connected to the bottom 12 of the shaft 100 and movable between a scoop-released position 152 parallel to the shaft 100 and a scoop-engaged position 153 perpendicular (i.e., approximately 90° angle) to the length of the shaft 100.

The handle 192 partially encompasses a handle trigger or lever 194. The handle trigger 194 is pivotally mounted to the handle 192, at a point inside the handle 192. An opposite end of the handle trigger 194 is pivotally mounted to the articulating actuating assembly 150. Engaging the handle trigger 194 retracts the articulating actuating assembly 150, against the spring 50, into a scoop-engaging position 153. In one implementation, an operator squeezes the handle trigger about 1 inch (i.e., ¾ inch to 1.5 inches) to move the scoop 110 from the scoop-released position 152 to the scoop-engaged position 153.

A lock 185 is also provided to lock the scoop 110 into an engaged position 153. The lock 185 is configured to be engaged when the articulating actuating assembly 150 is in the scoop-engaging position 153. In one implementation, shown in FIGS. 9 and 10, the lock 185 is a catch that pivots about a pivot point 186. The catch 185 can be engaged manually by pivoting it into the path of the projecting stub 158, after the stub 158 has traveled upwardly enough to allow a fisherperson or other operator to pivot the catch 185 into a stub-blocking position. The lock 185 can also be pivoted back into a stub-releasing position when the operator is ready to release the scoop 110.

In another implementation, not shown, the lock 185 is automatic. Engaging the handle trigger 194 far enough toggles a blocking mechanism into a blocking position. In both implementations, the lock 185 can be released to enable the articulating actuating assembly to travel down into the scoop-releasing position 152.

In one embodiment, the articulating scoop apparatus 10 also comprises an ice hole mount 175 (FIG. 3) connected to the shaft 100, freeing a fisherperson's hands and allowing a fisherperson to leave the articulating scoop apparatus 10 in the ice hole. In one implementation, the ice hole mount 175 includes one or more spikes 177 that can be pushed, by foot, into the ice, thereby securing the articulating scoop apparatus 10 to a side of the ice hole. The ice hole mount 175 is adjustably attached to the shaft 100 to account for different ice thicknesses and different preferences regarding the distance, beneath the water surface, to locate the scoop 110.

Overall, the length of the articulating scoop apparatus 10, with the scoop 110 engaged, is about 24-42 inches. This length is designed to enable use without forcing an adult of generally average size to get down on his/her knees to operate the articulating scoop apparatus 10. The articulating scoop apparatus 10 is also made up primarily of materials designed to withstand freezing temperatures, including temperature-resistant polypropylene and stainless steel.

Figure 12:
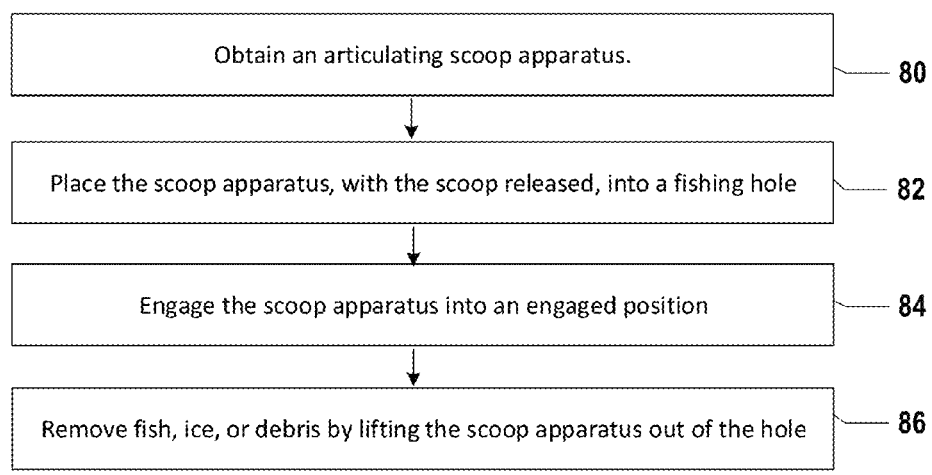
FIG. 12 is a flow chart of one embodiment of a method of using an articulating scoop apparatus.

The invention can also be characterized as a method. In FIG. 12, a method of ice fishing is provided. In action 80, obtain an articulating scoop apparatus 10 comprising a shaft 100 connecting a handle 192 to a scoop 110 and a handle-mounted trigger 194 for actuating an articulating rod assembly 150 to engage or release the scoop 110 between a scoop-engaged position 153 perpendicular to the shaft 100 and a scoop-released position 152 parallel to the shaft 100. In action 82, place the articulating scoop apparatus 10, with the scoop 110 in the scoop-released position 152, into an ice fishing hole. In action 84, engage the articulating scoop apparatus 10 into the scoop-engaged position 153. In action 86, use the articulating scoop apparatus 10 up out of the ice fishing hole to remove fish, ice, or debris.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

I claim:

1. An articulating scoop apparatus configured as an ice fishing tool, the apparatus comprising:
   a handle, a scoop, and a shaft connecting the handle to the scoop, wherein the scoop is hingedly connected to the shaft and movable between a position approximately parallel to the shaft and a position approximately perpendicular to the shaft; and
   an articulating actuating assembly comprising a spring and a set of pivotally-connected links that couples a handle trigger to the scoop;
   wherein actions of squeezing the handle trigger toward the handle and releasing the handle trigger causes the scoop to flip between the position approximately parallel to the shaft and the position approximately perpendicular to the shaft;
   wherein the scoop includes a flotation ring surrounding a rim of the scoop, the flotation ring providing sufficient buoyancy to prevent sinking of the articulating scoop apparatus.

2. The articulating scoop apparatus of claim 1, wherein the shaft has a length of between 24 and 42 inches, and the scoop has a diameter of between 5½ and 16 inches.

3. The articulating scoop apparatus of claim 1, wherein the scoop is perforated with apertures that allow water to pass through.

4. The articulating scoop apparatus of claim 1, wherein the flotation ring is toroidally shaped and hollow or foam-filled.

5. The articulating scoop apparatus of claim 1, wherein the scoop has a bowl-shaped profile.

6. The articulating scoop apparatus of claim 1, further comprising a lock configured to be engaged when the articulating actuating assembly is in the scoop-engaging position, the lock being further configured to be released when an operator releases the lock.

7. The articulating scoop apparatus of claim 1, wherein a first link of the set of pivotally-connected links is mounted for linear travel along a length of the shaft between scoop-engaging and scoop-releasing positions.

8. The articulating scoop apparatus of claim 1, wherein first link of the set of pivotally-connected links travels inside the shaft.

9. An articulating scoop apparatus configured as an ice fishing tool, the apparatus comprising:
   a handle, a scoop, and a shaft connecting the handle to the scoop, wherein the scoop is hingedly connected to the shaft and movable between a position approximately parallel to the shaft and a position approximately perpendicular to the shaft; and
   an articulating actuating assembly comprising a spring and a set of pivotally-connected links that couples a handle trigger to the scoop;
   wherein actions of squeezing the handle trigger toward the handle and releasing the handle trigger causes the scoop to flip between the position approximately parallel to the shaft and the position approximately perpendicular to the shaft;

further comprising an ice hole mount coupled to the shaft, the ice hole mount configured to securely attach the articulating scoop apparatus to ice surrounding an ice hole.

10. The articulating scoop apparatus of claim 9, wherein the scoop includes a flotation ring surrounding a rim of the scoop, the flotation ring providing sufficient buoyancy to prevent sinking of the articulating scoop apparatus.

11. An articulating scoop apparatus configured as an ice fishing tool, the apparatus comprising:

a handle, a scoop, and a shaft connecting the handle to the scoop, wherein the scoop is hingedly connected to the shaft and movable between a position approximately parallel to the shaft and a position approximately perpendicular to the shaft;

an articulating actuating assembly comprising a spring and a set of pivotally-connected links that couples a handle trigger to the scoop;

wherein actions of squeezing the handle trigger toward the handle and releasing the handle trigger causes the scoop to flip between the position approximately parallel to the shaft and the position approximately perpendicular to the shaft;

wherein a first link of the set of pivotally-connected links travels inside the shaft;

wherein a second link of the set of pivotally-connected links is mounted for travel along a longitudinal dimension of the shaft, wherein the second link of the set of pivotally-connected links is pivotally coupled to the first link.

12. The articulating scoop apparatus of claim 11, wherein a third link of the set of pivotally-connected links is pivotally connected to the second link of the set of pivotally-connected links, and the third link of the set of pivotally-connected links is pivotally coupled to a coupling of the scoop.

13. The articulating scoop apparatus of claim 12, wherein the coupling is hingedly connected to the shaft.

14. The articulating scoop apparatus of claim 13, wherein the first, second, and third links of the set of pivotally-connected links and the coupling are configured to articulate the scoop between the scoop-engaging and scoop-releasing positions as the handle trigger travels between squeezed and released positions.

15. An articulating scoop apparatus configured as an ice fishing tool, the apparatus comprising:

a handle, a scoop, and a shaft connecting the handle to the scoop, wherein the scoop is hingedly connected to the shaft and movable between a position approximately parallel to the shaft and a position approximately perpendicular to the shaft;

an articulating actuating assembly comprising a spring and a set of pivotally-connected links that couples a handle trigger to the scoop;

wherein actions of squeezing the handle trigger toward the handle and releasing the handle trigger causes the scoop to flip between the position approximately parallel to the shaft and the position approximately perpendicular to the shaft;

wherein an extension of the first link of the set of pivotally-connected links projects out of a first window of the shaft to engage with the handle trigger, and a terminal portion of the first link of the set of pivotally-connected links protrudes out of a second window of the shaft.

16. An articulating scoop apparatus configured as an ice fishing tool, the apparatus comprising:

a handle, a scoop, and a shaft connecting the handle to the scoop, wherein the scoop is hingedly connected to the shaft and movable between a position approximately parallel to the shaft and a position approximately perpendicular to the shaft;

an articulating actuating assembly comprising a spring and a set of pivotally-connected links that couples a handle trigger to the scoop;

wherein actions of squeezing the handle trigger toward the handle and releasing the handle trigger causes the scoop to flip between the position approximately parallel to the shaft and the position approximately perpendicular to the shaft;

wherein the spring is compressed between a first stop connected to the shaft and a second stop joined to a first link of the set of pivotally-connected links.

17. The articulating scoop apparatus of claim 16, wherein the scoop includes a flotation ring surrounding a rim of the scoop, the flotation ring providing sufficient buoyancy to prevent sinking of the articulating scoop apparatus.

18. An articulating scoop apparatus configured as an ice fishing tool, the apparatus comprising:

a handle, a scoop, and a shaft connecting the handle to the scoop;

an articulating actuating assembly comprising one or more pivotally-connected links that couple a handle trigger to the scoop; and a lock configured to lock the articulating actuating assembly in a scoop-engaging position;

wherein the scoop is pivotally mounted to the shaft and is perforated with apertures that allow water to pass through;

wherein the scoop includes a flotation ring surrounding a rim of the scoop, the flotation ring providing sufficient buoyancy to prevent sinking of the articulating scoop apparatus;

wherein when the lock is not engaged to block the articulating actuating assembly, actions of squeezing the handle trigger toward the handle and releasing the handle trigger cause the scoop to move between a position approximately parallel to the shaft and a position approximately perpendicular to the shaft.

19. An articulating scoop apparatus configured as an ice fishing tool, the apparatus comprising:

a handle, a scoop, and a shaft connecting the handle to the scoop;

an articulating actuating assembly comprising one or more pivotally-connected links that couple a handle trigger to the scoop;

a lock configured to lock the articulating actuating assembly in a scoop-engaging position; and an ice hole mount coupled to the shaft, the ice hole mount configured to securely attach the articulating scoop apparatus to ice surrounding an ice hole;

wherein the scoop is pivotally mounted to the shaft and is perforated with apertures that allow water to pass through;

wherein when the lock is not engaged to block the articulating actuating assembly, actions of squeezing the handle trigger toward the handle and releasing the handle trigger cause the scoop to move between a position approximately parallel to the shaft and a position approximately perpendicular to the shaft.

* * * * *